US010250548B2

(12) United States Patent
Ma et al.

(10) Patent No.: US 10,250,548 B2
(45) Date of Patent: Apr. 2, 2019

(54) SOCIAL MEDIA ENGAGEMENT ENGINE

(71) Applicant: SAP SE, Walldorf (DE)

(72) Inventors: Hongbo Ma, Chengdu (CN); Feng Li, Chengdu (CN); Xuan Yang Dai, Chengdu (CN); Yong Wu, Chengdu (CN); Marc-Oliver Klein, Mannheim (DE)

(73) Assignee: SAP SE, Walldorf (DE)

( * ) Notice: Subject to any disclaimer, the term of this patent is extended or adjusted under 35 U.S.C. 154(b) by 190 days.

(21) Appl. No.: 15/252,181

(22) Filed: Aug. 30, 2016

(65) Prior Publication Data
US 2018/0063065 A1 Mar. 1, 2018

(51) Int. Cl.
*H04L 12/58* (2006.01)
*H04L 29/08* (2006.01)
*G06F 17/27* (2006.01)
*H04W 4/14* (2009.01)

(52) U.S. Cl.
CPC .......... *H04L 51/32* (2013.01); *G06F 17/278* (2013.01); *G06F 17/2785* (2013.01); *H04L 51/12* (2013.01); *H04L 67/22* (2013.01); *H04L 51/02* (2013.01); *H04L 67/02* (2013.01); *H04L 67/10* (2013.01); *H04W 4/14* (2013.01)

(58) Field of Classification Search
CPC ......... H04L 51/02; H04L 51/04; H04L 51/12; H04L 51/32; H04L 51/046; H04L 67/02; H04L 67/10; H04L 67/22; G06F 17/27; G06F 17/278; G06F 17/2785; H04W 4/21; H04W 4/14

USPC ........................................................ 709/206
See application file for complete search history.

(56) References Cited

U.S. PATENT DOCUMENTS

| | | | |
|---|---|---|---|
| 9,037,655 B2 * | 5/2015 | Cross | H04L 12/581 709/206 |
| 2010/0058183 A1 * | 3/2010 | Hamilton, II | G06Q 30/02 715/706 |
| 2010/0246797 A1 * | 9/2010 | Chavez | G06F 17/30864 379/265.02 |
| 2012/0036201 A1 * | 2/2012 | Cole | H04L 51/32 709/206 |
| 2012/0036204 A1 | 2/2012 | Cole | |
| 2012/0323928 A1 * | 12/2012 | Bhatia | G06F 17/30528 707/748 |
| 2013/0238979 A1 | 9/2013 | Sayers, III et al. | |
| 2013/0297436 A1 | 11/2013 | Vogel | |
| 2013/0326375 A1 | 12/2013 | Barak et al. | |
| 2014/0074551 A1 | 3/2014 | Setayesh et al. | |
| 2014/0089038 A1 | 3/2014 | Bagheri et al. | |
| 2015/0227579 A1 * | 8/2015 | Cantarero | G06F 17/30616 707/708 |
| 2016/0094506 A1 * | 3/2016 | Harden | H04L 51/02 707/602 |

* cited by examiner

Primary Examiner — Ruolei Zong
(74) Attorney, Agent, or Firm — Jones Day

(57) ABSTRACT

Described herein is a social media engagement engine. In accordance with another aspect of the framework, a social media message from a person (e.g., customer, prospect) is received via a social media data connector plugged into a social media interface. The social media message may be analyzed to generate processed data. At least one predefined rule is identified based on the processed data. The framework then facilitates engagement with the person according to the predefined rule.

17 Claims, 4 Drawing Sheets

SOCIAL MEDIA ENGAGEMENT ENGINE

TECHNICAL FIELD

The present disclosure relates generally to computer systems, and more specifically, to a social media engagement engine.

BACKGROUND

Social media is becoming more and more important for acquiring new customers (e.g., growing the number of fans and converting fans to customers) and keeping existing customers (e.g., via loyalty reward programs). Customers, including those on social media platforms, want to be served or engaged in a personalized way. Currently, engagements with prospects or customers over social media are very costly or impersonal.

SUMMARY

A framework for social media engagement is described herein. In accordance with one aspect of the framework, a social media message from a person (e.g., customer, prospect) is received via a social media data connector. The social media message may be analyzed to generate processed data. A rule engine may then determine, based on the processed data, whether the engagement is to be manually or automatically conducted with the person. In response to determining the engagement is to be manually conducted, a response from an agent may be invoked via an engagement workbench. In response to determining the engagement is to be automatically conducted, the response may be automatically generated based on information extracted from an application system. The invoked or generated response may then be transmitted to the social media data connector.

In accordance with another aspect of the framework, a social media message from a person (e.g., customer, prospect) is received via a social media data connector plugged into a social media interface. The social media message may be analyzed to generate processed data. At least one predefined rule is identified based on the processed data. The framework then facilitates engagement with the person according to the predefined rule.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
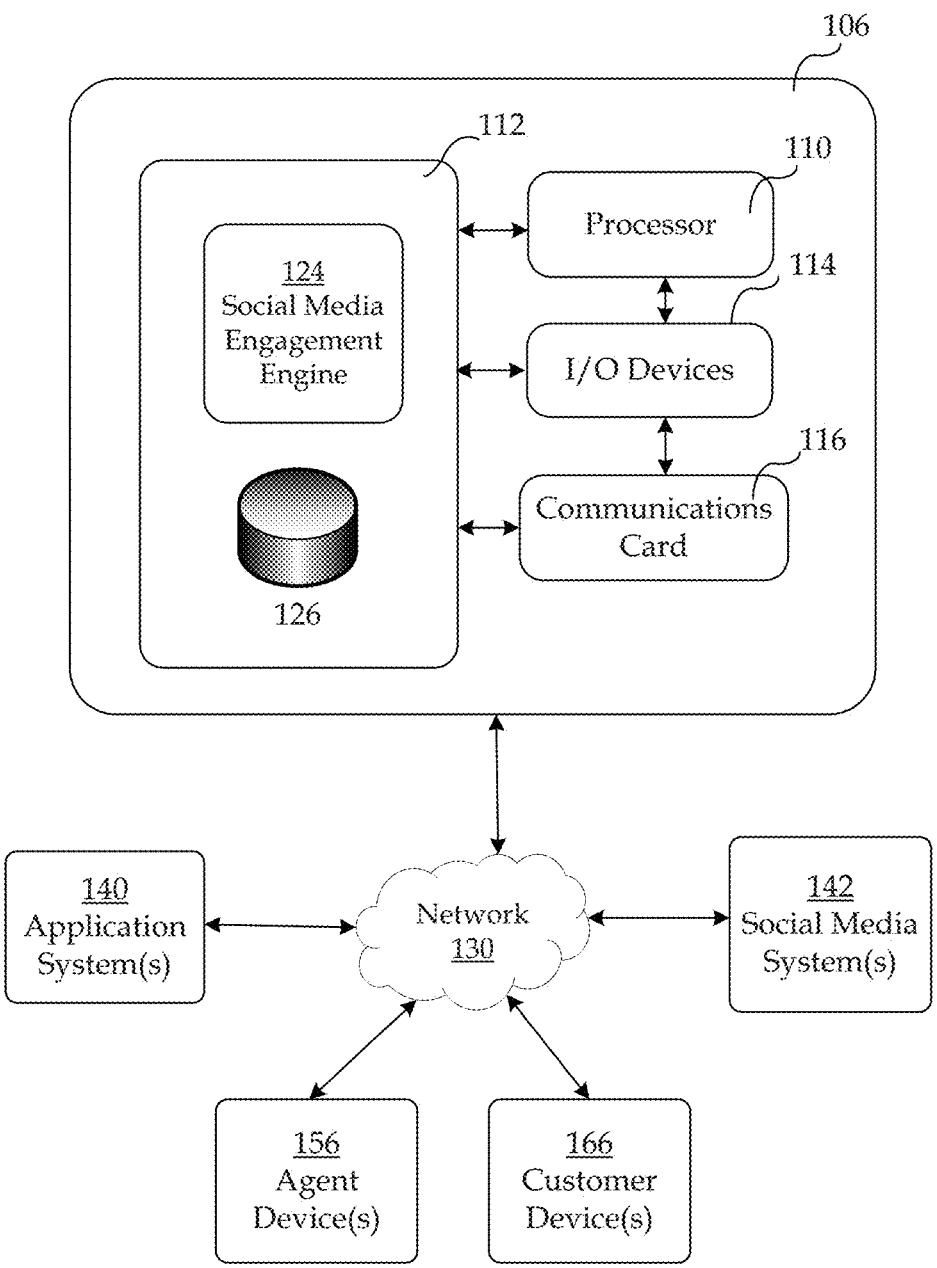
FIG. 1 is a block diagram illustrating an exemplary architecture.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for social media engagement is described herein. One aspect of the present framework provides an open platform to conduct personalized engagements (i.e., interactions) with persons (e.g., customers, prospects, clients) over social media in a cost-effective way. Engagements may be conducted manually, semi-automatically or automatically over social media or other communication channels. Information may be automatically extracted from internal application systems to facilitate such interactions.

In accordance with one aspect of the framework, a social media message is received from a social media data connector. The social media message may then be analyzed by a data processor. The data processor analyzes the social media message to extract relevant data (e.g., product or service name mentioned in the message, whether it is a request, complaint or general question, etc.), enrich the extracted data if necessary (e.g., sentiment of the customer, importance level of the customers/prospects, etc.), as well as filter out dirty data. The processed data may then be forwarded to the rule engine. The rule engine determines the approach to conduct the engagement based on the processed data. For example, the rule engine may determine whether the engagement is to be manually conducted by an agent or automatically conducted using a connected application system. A response from the agent (in case of manual engagement) or a response from the connected application system (in case of automatic engagement) may then be transmitted to the social media data connector.

The framework may serve as an interaction hub where an automatic process may request for engagement support (e.g., product registration) from internal application systems according to a predefined rule. The framework may also serve as a unified engagement platform that provides a workbench for an agent to engage with customers or prospects over social media (e.g., chatting). The present framework may enable harmonized integration with other engagement channels, such as call centers, commerce platforms, stores, and so forth. In addition, the present framework may support collaboration and cooperation within team members.

The present framework includes one or more interfaces that support an open and flexible digital ecosystem. The one or more interfaces allow developers (e.g., third-party partners) generate data connectors that can easily be plugged in to provide access to, for example, new social media channels and application systems. Advantageously, the framework makes it easy to add new social media channels and new application systems, so that engagement may adapt quickly to the changing business process and environment without additional investment in changing the engagement engine itself. Additionally, the present framework may be implemented based on a cloud computing model (e.g., software as a service or SaaS) to provide shared processing resources and data to computers and other devices on demand.

It should be appreciated that the framework described herein may be implemented as a method, a computer-controlled apparatus, a computer process, a computing system, or as an article of manufacture such as a computer-usable medium. These and various other features and advantages will be apparent from the following description.

FIG. 1 is a block diagram illustrating an exemplary architecture 100 in accordance with one aspect of the present framework. Generally, exemplary architecture 100 may include server 106, one or more application systems 140, one or more social media systems 142, one or more agent devices 156 and one or more customer devices 166 interconnected via network 130.

Server 106 can be any type of computing device capable of responding to and executing instructions in a defined manner. Server 106 may include a processor 110, input/output (I/O) devices 114 (e.g., touch screen, keypad, touch pad, display screen, speaker, etc.), a memory module 112 and a communications card or device 116 (e.g., modem and/or network adapter) for exchanging data with a network (e.g., local area network or LAN, wide area network (WAN), Internet, etc).

It should be appreciated that the different components and sub-components of the server 106 may be located or executed on different machines or systems. For example, one or more components (e.g., processors) may be executed on different cloud computers connected via the network 130 (e.g., the Internet) at the same time to support a "cloud computing" environment or as a "software as a service" (SaaS). At least some of the operations may be performed by a group of computers (as examples of machines including processors), and made accessible via the network 130 and one or more appropriate interfaces (e.g., Application Program Interfaces (APIs)).

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, server 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 includes social media engagement engine 124 and database 126. Social media engagement engine 124 serves to facilitate engagements conducted via social media system(s) 142 between agent device(s) 156 and customer device(s) 166. Database 126 may include, for example, rules that are predefined to generate, retrieve and/or distribute information and tasks associated with the engagements.

Application system 140 is a system or platform that collects, stores and/or processes information relevant to customers or prospects of an organization. Application system 140 may be, for instance, an internal or backend information technology (IT) system (e.g., customer relationship management or CRM system, enterprise resource planning or ERP system, e-commerce system, virtual community, third-party system), an electronic commerce platform (e.g., SAP Hybris) or a forum (or virtual community) (e.g., SAP Jam). Application system 140 may also be any other type of third-party data source.

Social media system 142 is a social media platform or social networking platform that can be used by social media users who operate agent device 156, customer device 166 or other client devices that are connected over network 130 to exchange social media messages or postings (e.g., text, pictures, videos, multimedia data) in virtual communities and networks. Social media system 142 may be implemented in different forms, including but not limited to, blogs, business networks, social networks, forums, microblogs, review website, social gaming site, and virtual worlds. For example, social media system 142 may be embodied as FACEBOOK®, a social networking service and website launched in February 2004, operated and privately owned by Facebook Inc. of Menlo Park, Calif., TWITTER®, an online social networking service and microblogging service that enables its users to send and read text-based posts known as "tweets," operated by Twitter Inc. of San Francisco, Calif., and/or other types of social media technologies (e.g., WeChat, WhatsApp, Weibo, Instagram, Viber, Skype, Snapchat, etc.). A social media message may be communicated by the customer via one of multiple portals on social media system 142 (e.g., company wall, etc.) to a particular organization (e.g., company). Social media system 142, in turn, may communicate the social media message over the network 130 to server 106, agent devices 156 and/or customer devices 166.

Agent device 156 and customer device 166 can be any type of computing device (e.g., mobile device, smartphone, laptop) capable of responding to and executing instructions in a defined manner. An agent device 156 may be used by an agent or employee of an organization (e.g., salesperson, marketing executive, manager), while a customer device 166 may be used by a customer or prospect of the organization. The agent device 156 and customer device 166 may each include an application (e.g., mobile application or App) configured to present a user interface (e.g., graphical user interface) to access information and services. Such information and services may be provided by server 106, application system 140 and/or social media system 142. In some implementations, the customer device 166 may access information and services provided only by social media system 142.

Figure 2:
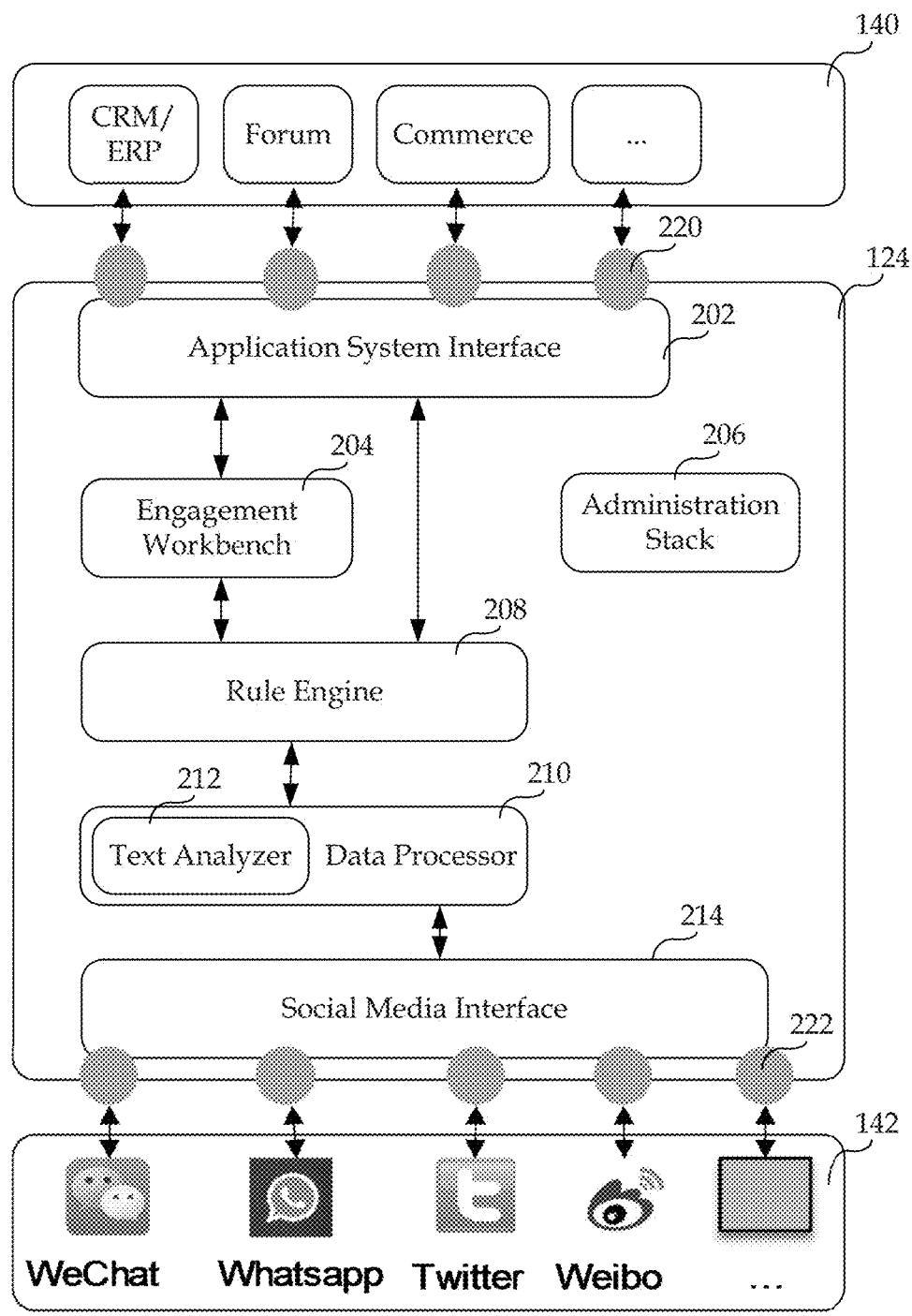
FIG. 2 shows an exemplary architecture of the social media engagement engine.

FIG. 2 shows an exemplary architecture of the social media engagement engine 124. In some implementations, social media engagement engine 124 includes, but is not limited to, an application system interface 202, an engagement workbench 204, an administration stack 206, a rule engine 208, a data processor 210 with a text analyzer 212 and a social media interface 214.

The administration stack 206 serves to manage the running of the social media engagement engine 124. The administration stack 206 may store configuration data that defines the data models, engagement rules, connector configuration, data mappings, etc. that are used by the social engagement engine 124. The configuration data may be provided as system default values or by a user via a user interface presented by, for example, the engagement workbench 204.

The engagement workbench 204 provides a user interface for users (e.g., agents) to view, process and take action in response to social media messages and related information. For example, the user may generate a service ticket via the engagement workbench 204 in response to the social media message describing an issue experienced with a product or service. As another example, the user may trigger engagement with the customer via another communication channel (e.g., email, video chat, telephone or facsimile) in response to the social media message. Other actions are also possible. In some implementations, the user may view the complete interaction history with the particular customer or other information that facilitates a personalized context-based engagement. Users may also provide configuration data to manage the social engagement engine 124 via the engagement workbench 204. The user interface may be accessible via system 106 and/or agent device 156.

Social media interface 214 serves as a standardized interface to communicate data to and from different social media systems 142 (e.g., WeChat, WhatsApp, Twitter, Weibo, etc.) using social media data connectors 222. Social media data connectors 222 may be plugged into social media interface 214 to programmatically access social media systems 142. Each social media data connector 222 encapsulates all the information necessary to connect to and query a specific social media system 142. Such information may include, for example, the name of the social media database server, type of data provider to use and the credentials required for database access. Other types of information may also be required, depending on the particular social media system 142.

Application system interface 202 serves as a standardized interface to communicate data to and from different application systems 140 (e.g., CRM, ERP, forum, commerce, etc.) using application data connectors 220. Application data connectors 220 may be plugged into application system interface 202 to programmatically access the application systems 140. Each application data connector encapsulates all the information necessary to connect to and query a specific application system 140. Such information may include, for example, the name of the application server, type of data provider to use and the credentials required for database access.

In some implementations, the user may specify the data connectors (220, 222) to plug into the interface (202, 214) via the engagement workbench 204. For example, the engagement workbench 204 may present an input element (e.g., text box, pull-down menu) in which the user may enter the name and/or location (e.g., Uniform Resource Locator, endpoint address) of the data connector (220, 222). Other methods of specifying the data connector are also useful. The data connectors (220, 222) may advantageously be defined by third-party developers to support new application systems 140 or new social media systems 142.

All the data retrieved by the data connectors (220, 222) as well as processed and other data may be stored in database 126. Data processor 210 serves to clean, enrich, analyze and/or categorize the data. Data processor 210 may include a text analyzer 212 that derives information from the text in the social media messages. Rule engine 208 stores one or more predefined engagement rules that define the manner in which engagements are to be conducted. For example, the engagement rules may define actions to be performed either by the agent and/or the social media engagement engine 124 in response to the social media messages. Such rules may be predefined by, for example, the user via the engagement workbench 204.

Figure 3:
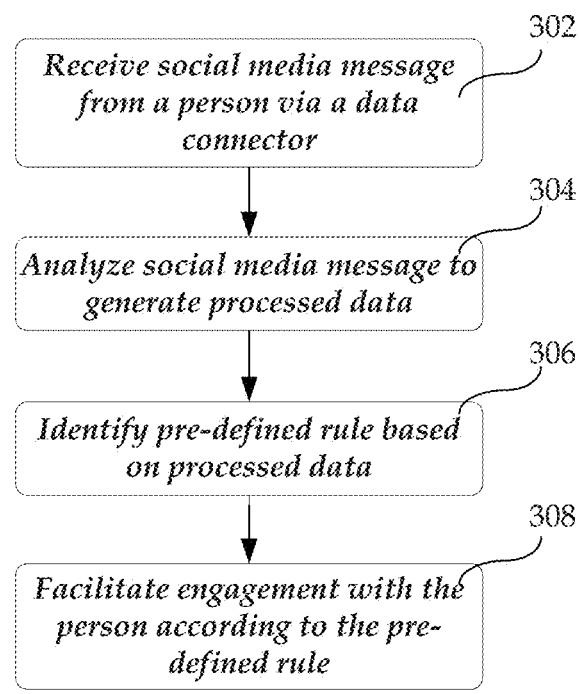
FIG. 3 shows an exemplary method of social media engagement.

FIG. 3 shows an exemplary method 300 of social media engagement. The method 300 may be performed automatically or semi-automatically by the system 100, as previously described with reference to FIGS. 1 and 2. It should be noted that in the following discussion, reference will be made, using like numerals, to the features described in FIGS. 1 and 2.

At 302, social media engagement engine 124 receives one or more social media messages from a person via social media data connector 222. As discussed previously, the social media data connector 222 may be plugged into the social media interface 214 to connect to a social media system 142. The social media message may be stored in, for example, database 126. Multiple social media messages directed to a particular organization may be harvested from different social media systems 142. Each social media message may be sent from a person, such as a customer, client or prospect, to an organization. The social media message may include, for example, textual, audio, image, video or other multimedia data.

At 304, data processor 210 in the social media engagement engine 124 analyzes the social media message to generate processed data. In some implementations, data processor 210 analyzes the social media message by invoking text analyzer 212 to extract relevant data, including but not limited to, the person's name and information, nature of message (e.g., whether it is a request, complaint, general question, etc.), product and/or service mentioned in the message, and so forth. Data processor 210 may further filter out dirty data and enrich the data where necessary by deriving further information from the extracted data, such as sentiment (e.g., satisfied, happy, rating), importance level of the person, etc.

At 306, data processor 210 forwards the processed data to the rule engine 208 to identify a predefined rule of engagement. The predefined rule defines the approach to conduct the engagement based on the processed data. The predefined rule may include a set of instructions governing engagement given certain conditions. The predefined rule may be identified based on the processed data, such as the nature of the message (e.g., whether message is a request, complaint or general questions), sentiment or importance level of the person.

At 308, rule engine 208 facilitates engagement with the customer or prospect according to the predefined rule. In some implementations, rule engine 208 extracts relevant information via the application data connector 220 according to the predefined rule. As discussed previously, the application data connector 220 may be plugged into the application system interface 202 to retrieve information from the application system 140. Relevant information may be identified based on the predefined rule. For example, the predefined rule may indicate that knowledge articles relevant to the issue described in the social media message be retrieved from a forum or other knowledge base. Rule engine 208 then routes the social media message and relevant information according to the predefined rule.

In some implementations, rule engine 208 determines, based on the predefined rule, whether the engagement is to be manually conducted by an agent or automatically conducted using a connected application system. In some cases, rule engine 208 determines, based on the predefined rule, that the engagement is to be manually conducted by an agent. For example, the predefined rule may indicate that the engagement should be manually conducted by an agent if the processed data indicate that the person who sent the social media message is of high importance (e.g., frequent buyer with many loyalty points). The predefined rule may further identify which agent or group of agents (e.g., marketing agent, service agent, salesperson, customer relations agent, etc.) to take action in response to the social media message, what action the agent should take (e.g., text reply, service request, product registration, etc.), what information to extract from the application system 140 (e.g., customer information, service account, product information, information of interest to customers or followers), and so forth. In such case, rule engine 208 may route the social media message and any relevant information to the engagement workbench 204 to be displayed at a user interface of a particular agent device 156. The agent may then be invoked to use the displayed information to generate a response to the social media message. The response may be, for example, a social media message including text entered by the agent. Such response may be transmitted to the social media data connector 222 via social media interface 214. Alternatively, the response may also be transmitted via other communication channels, such as email, short message service (SMS), facsimile, telephone call, video conferencing, printed letter, and so forth.

Alternatively, rule engine 208 may determine that the engagement is to be automatically conducted. For example, the predefined rule may indicate that the engagement should be automatically conducted if the processed data indicate that the issue described in the message can easily be handled by the customer. In such case, the rule engine 208 automatically generates a response to the social media message. The response may be, for example, a social media message including text automatically generated based on the relevant information extracted from the application system 140 (e.g., links to knowledge articles or forum entries, product registration information, service ticket) to facilitate self-service. Such response may be transmitted to the social media data connector 222 via social media interface 214. The response may also be transmitted via other communication channels, such as email, short message service (SMS), facsimile, telephone call, video conferencing, printed letter, and so forth.

Figure 4:
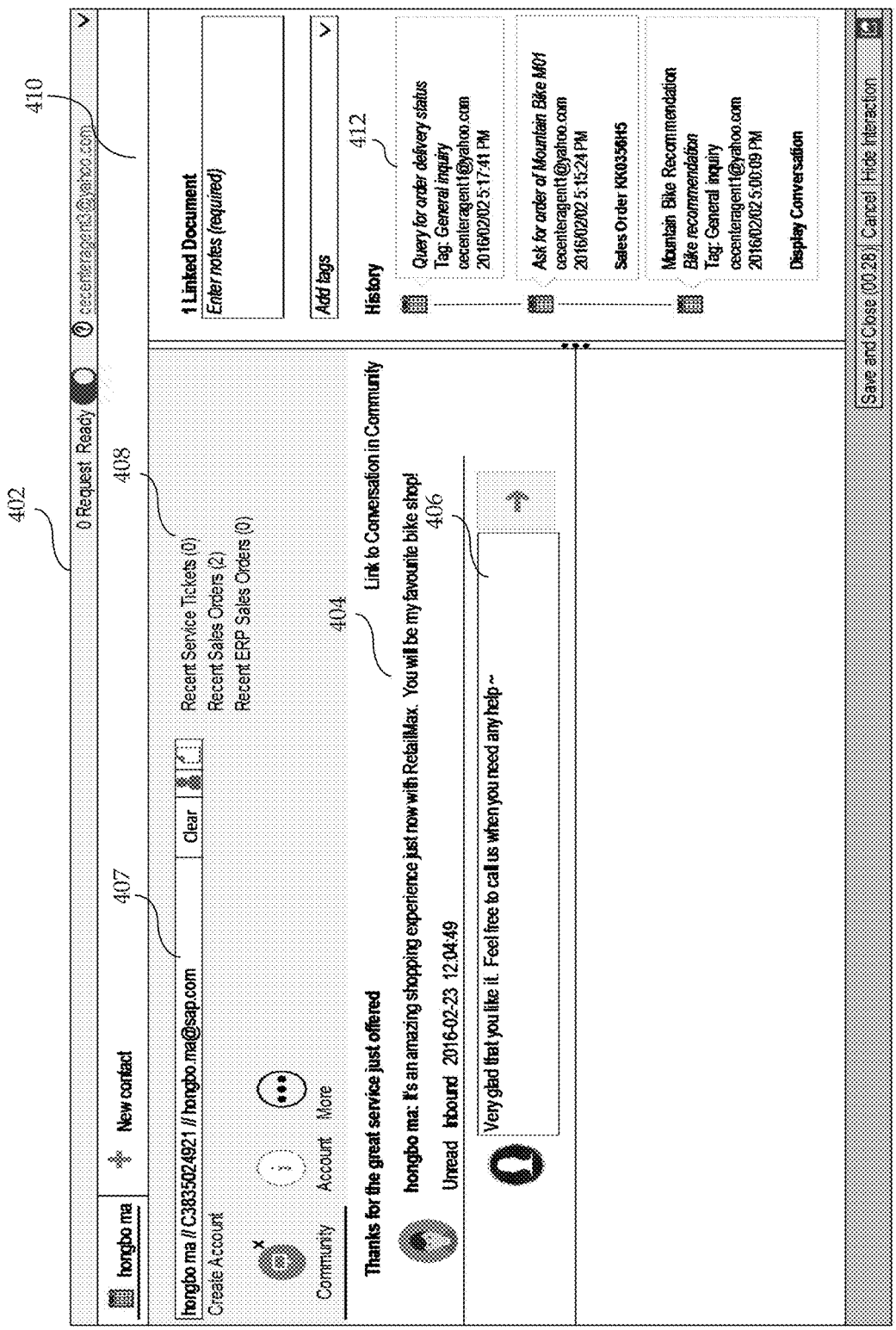
FIG. 4 shows an exemplary screenshot of a user interface of the engagement workbench.

FIG. 4 shows an exemplary screenshot of a user interface 402 generated by the engagement workbench 204. The user interface 402 includes an area 404 that displays the social media message as well as an input area 406 where the agent can type a reply to the social media message. The agent may make use of different types of relevant information extracted by the social engagement engine 124 and displayed by the user interface 402 to generate a personalized reply to the social media message writer. Such information includes, for example, information 407 about the social media message writer, recent transactions 408 associated with the writer (e.g., recent service tickets, sales orders, ERP sales orders), documents 410 retrieved from the application server 140 that are relevant to the social media message, interaction history 412 between the social media message writer and the agent or social engagement engine 124 (i.e., in self-service scenarios), and so forth.

In a first exemplary use case, MaTV is a TV manufacturer and its service team is using social media engagement engine 106 to serve their customers on social media. In order to better engage with its customers, MaTV sets up a WeChat service account. Many of its existing customers are following this service account and engaging with the manufacturer via WeChat on their mobile phones.

One of its customers, Tom, is having a problem with his television. Tom wants to ask for help using WeChat on his phone. Tom sends a WeChat message including detailed description of the issue he is encountering, along with a picture to illustrate the issue, to MaTV's WeChat service account. Social media engagement engine 124 automatically distributes this WeChat message to Lucy, an agent of MaTV's service team, based on predefined distribution rules extracted from the rule engine 208.

Lucy receives the request via the engagement workbench 204, and starts chatting with Tom to request for more information. Based on the information Tom provided, Lucy checks knowledge articles from the company's forum displayed by the engagement workbench 204, and sends a hyperlink of an article to Tom that she thinks is helpful. Tom opens the article and follows the instructions provided. However, the issue still persisted and Tom updates Lucy again.

In the engagement workbench 204, Lucy creates a service request and sends it to MaTV's customer relationship management (CRM) system. In its CRM system, the resource planner assigns a technician to attend to this service request. Tom checks the service request via WeChat on his phone, and knows the name and contact information (e.g., telephone number) of the technician and when the technician will come to fix the issue.

In a second exemplary use case, MaTV is a TV manufacturer and its marketing team is using social media engagement engine 124 to engage with customers and prospects. In order to better acquire new customers and maintain the loyalty of existing customers, MaTV sets up a WeChat service account. The followers of this account are either MaTV's customers or prospects who are interested in MaTV's products.

Lucy, a marketing professional from MaTV, regularly sends out some funny or useful information (e.g., jokes, TV maintenance tips, events, etc.) via WeChat to MaTV's followers from the engagement workbench 204. Tom, a customer of MaTV, sees the joke sent from MaTV's service account, and likes the joke. He then shares this joke to all of his friends on WeChat. Max, a friend of Tom, sees the joke, and wants to directly receive such jokes in future. Therefore, Max follows MaTV's WeChat service account.

Some months later, Max wants to buy a new television. From his engagement with the service account, he feels MaTV is a reliable provider. Max joins MaTV's membership using WeChat service account, and navigates to MaTV's e-commerce system. He buys a television there, and pays via WeChat payment. From WeChat, Max checks the order status of his new television, and his membership information (e.g., points). After the TV is delivered, Max registers his television with its serial number via WeChat. From the engagement workbench 204, Lucy checks a report to understand which information followers finds most interesting and which information can help generate more followers.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of social media engagement, comprising:
receiving a social media message from a person via a social media data connector;
generating processed data by analyzing the social media message, the generating comprising:
extracting data from the social media message,
determining an importance level of the person, and
enriching the extracted data with the determined importance level of the person,
determining, by a rule engine based on the processed data including the determined importance level of the person, whether an engagement is to be manually or automatically conducted with the person;
in response to determining the engagement is to be manually conducted, invoking a response from an agent via an engagement workbench;
in response to determining the engagement is to be automatically conducted, automatically generating the response based on information extracted from an application system; and
transmitting the invoked or generated response to the social media data connector;
wherein at least one predefined rule executed by the rules engine (i) identifies which agent or group of agents to take action in response to the social media message, (ii) what action the identified agent should take, (ii) what information to extract from an external application system.

2. The method of claim 1 wherein extracting the data comprises extracting a product or service name.

3. The method of claim 1 further comprises plugging the social media data connector into a social media interface to connect to a social media channel.

4. The method of claim 3 wherein the social media channel comprises a blog, business network, enterprise social network, forum, microblog, review website, social gaming site or virtual world.

5. The method of claim 3 further comprises receiving, via the engagement workbench, a user input of a location of the social media data connector.

6. The method of claim 1 further comprises extracting the information from the application system via an application data connector.

7. The method of claim 6 further comprises plugging the application data connector into an application system interface to connect to a new application system.

8. The method of claim 6 wherein extracting the information from the application system comprises extracting the information from a customer relationship management system, an enterprise resource planning system, an e-commerce system, a virtual community or third-party system.

9. The method of claim 6 wherein extracting the information from the application system comprises extracting the information from an electronic commerce platform or a forum.

10. One or more non-transitory computer-readable media having stored thereon program code, the program code executable by one or more computers to perform operations comprising:
receiving a social media message from a person via a social media data connector plugged into a social media interface;
generating processed data by analyzing the social media message, the generating comprising:
extracting data from the social media message,
determining a sentiment of the person, and
enriching the extracted data with the determined sentiment of the person;
identifying at least one predefined rule based on the processed data including the determined sentiment of the person, the at least one predefined rule identifying which agent to interact with the person, what action such agent should take, and what information to extract from an external application system; and
facilitating engagement with the person according to the predefined rule and the associated information extracted from the external application system.

11. The one or more non-transitory computer-readable media of claim 10, wherein the program code is executable by the one or more computers to facilitate the engagement by extracting information from an application system via an application data connector plugged into an application system interface.

12. The one or more non-transitory computer-readable media of claim 11 wherein the application system comprises a customer relationship management system, an enterprise resource planning system, an e-commerce system, a virtual community or third-party system.

13. The one or more non-transitory computer-readable media of claim 10, wherein the program code is executable by the one or more computers to facilitate the engagement by invoking a response from an agent via an engagement workbench in response to determining the engagement is to be manually conducted.

14. The one or more non-transitory computer-readable media of claim 13 wherein the program code is executable by the one or more computers to invoke the response from the agent by displaying the social media message at a user interface generated by the engagement workbench.

15. The one or more non-transitory computer-readable media of claim 14 wherein the program code is executable by the one or more computers to display, at the user interface, information extracted from an application system.

16. The one or more non-transitory computer-readable media of claim 10, wherein the program code is executable by the one or more computers to facilitate the engagement by automatically generating a response based on information extracted from an application system in response to determining the engagement is to be automatically conducted.

17. A cloud system, comprising:
one or more computers; and
a non-transitory computer-readable media coupled to the one or more computers and storing machine-executable program code thereon which, when executed by the one or more cloud computers, cause the one or more computers to perform operations comprising:
receiving a social media message from a person via a social media data connector plugged into a social media interface,
generating processed data by analyzing the social media message, the analyzing comprising determining at least one of: an importance level of the person or a sentiment of the person,
identifying at least one predefined rule based on the processed data including the determined importance level of the person and sentiment of the person, extracting, via an application connector and in response to the identification of the at least one predefined rule, additional information from an application system, the application system collecting, storing and processing information relevant to customers or prospects of an organization, and facilitating engagement with the person according to the predefined rule and using the extracted additional information, the engagement including providing the extracted additional information in a graphical user interface displayed to an agent and invoking a response from the agent via an engagement workbench or automatically generating the response based on information extracted from an application system.

* * * * *